US012570311B2

(12) United States Patent
Langefeld et al.

(10) Patent No.: US 12,570,311 B2
(45) Date of Patent: Mar. 10, 2026

(54) SIMPLIFICATION OF CLOUD RESOURCE PROVISIONING USING DEFAULT WRAPPERS

(71) Applicant: GM Cruise Holdings LLC, San Francisco, CA (US)

(72) Inventors: Jonathan Langefeld, Lathrop, CA (US); Marco Messenzio, Sunnyvale, CA (US); Zhimin Xiang, Bellevue, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 40 days.

(21) Appl. No.: 18/401,992

(22) Filed: Jan. 2, 2024

(65) Prior Publication Data

US 2025/0214605 A1     Jul. 3, 2025

(51) Int. Cl.
  *B60W 60/00*        (2020.01)
  *H04L 67/12*        (2022.01)
(52) U.S. Cl.
  CPC ........... *B60W 60/001* (2020.02); *H04L 67/12* (2013.01); *B60W 2556/45* (2020.02)

(58) Field of Classification Search
  CPC .. B60W 60/001; B60W 2556/45; H04L 67/12
  See application file for complete search history.

(56) References Cited

U.S. PATENT DOCUMENTS

| | | | |
|---|---|---|---|
| 11,593,143 B2* | 2/2023 | Banerjee | G06F 9/45558 |
| 2023/0192076 A1* | 6/2023 | Martin-Bragado | G06V 20/58 |
| | | | 701/14 |

* cited by examiner

*Primary Examiner* — Rodney A Butler
(74) *Attorney, Agent, or Firm* — Honigman LLP; Matthew H. Szalach; Jonathan P. O'Brien

(57) ABSTRACT

A system for provisioning a plurality of resources in connection with a service to be provided in an autonomous vehicle (AV) infrastructure environment is described and includes a cloud platform executing a platform as a service (PaaS) cluster; a service-specific file specifying the plurality of resources; a values file specifying configuration information for each of the plurality of resource specified in the service-specific file; and a service for deploying the plurality of resources comprising the service on the cloud services platform using the service-specific file and the values file.

20 Claims, 6 Drawing Sheets

SIMPLIFICATION OF CLOUD RESOURCE PROVISIONING USING DEFAULT WRAPPERS

TECHNICAL FIELD

The present disclosure relates generally to cloud-based software systems and, more specifically, to simplification of cloud resource provisioning using default wrappers for use in autonomous vehicle (AV) infrastructure.

BACKGROUND

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
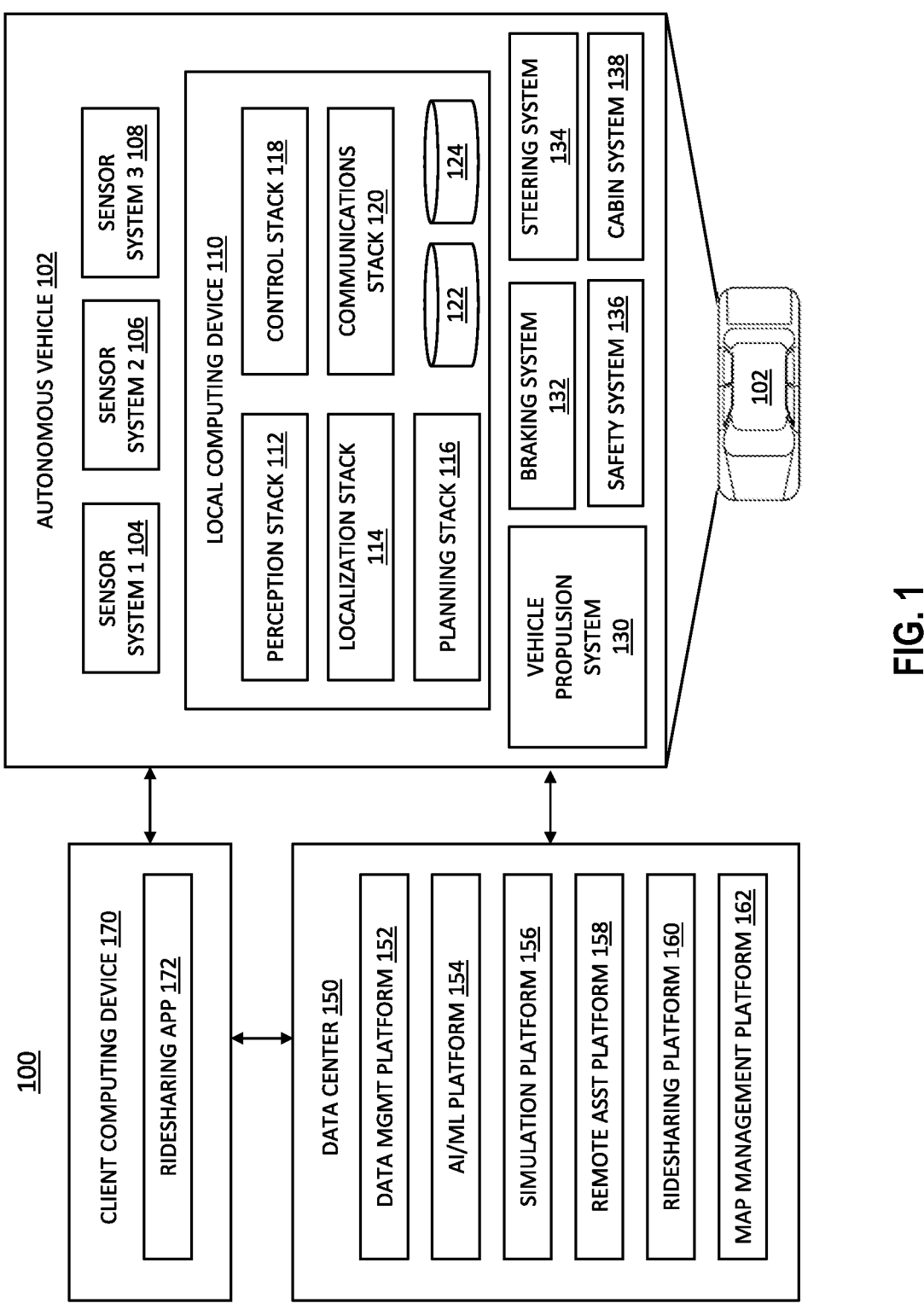
FIG. 1 illustrates an example system environment that can be used to facilitate AV dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by AVs, it is anticipated that AV provision of such services will soon become the ubiquitous choice for various user transportation and delivery needs, including but not limited to school commutes, airport transfers, long distance road trips, and grocery and restaurant deliveries, to name a few.

As rideshare services provided by AVs have become more widely available, the complexity of AV automation has continued to increase. Automation of driving operations may be seen as adding a layer of cognitive intelligence to basic vehicle platforms. As perception and planning algorithms have become increasingly responsible for critical decisions made by AVs, software has emerged as a primary driver of AV innovation. It will be recognized that as the amount of software used to control AV operations grows, so does the need to deploy advanced software engineering methods and tools to manage and accommodate the complexity, size, and criticality of such software.

Developing an urban fleet of fully autonomous vehicles is an enormous challenge. To succeed, an AV company needs to build both the AV tech that is out on the road as well as an ecosystem of tools engineers can use internally.

The service infrastructure of an AV company may spread across a vast, diverse set of repositories (or repos). It would be beneficial to provide a unified approach to provisioning and deployment of such service infrastructure. Additionally, it would be beneficial to fulfill an expectation that the deployment environment is all-encompassing and contains the totality of necessary services. In accordance with features of embodiments described herein, a deployment model and configurations may be standardized through a finite set of available options from a set of available choices. As a result, many (e.g., hundreds or even thousands) of cells can be stamped out and orchestrated in a unified manner using familiar primitives derived, for example, from Kubernetes (or K8s) ecosystem and methodology.

In particular embodiments, an overall structure and syntax of a minimal set of resource definitions (e.g., Crossplane composition custom resource definitions (CRDs)) may be defined for enabling cell creation and service deployments. As will be described hereinbelow, embodiments described herein enable deployment and operation of a minimal set of services in a cell to help scale and replicate infrastructure quickly, definition of integration points with platform as a service (PaaS)/continuous integration (CI)/continuous deployment (CD) subsystems, seamless integration with a proposed release and deployment lifecycle implementation, and implementation of a cell orchestration layer. In particular, embodiments described herein serve to automate provisioning and deployment of cloud resources as well as other resources, including but not limited to, for example, K8s resources and clusters, and to define requirements for integration points with CI infrastructure.

Although embodiments described herein may be implemented in connection with and find application to any number of different open source and/or commercial software tools, platforms, and/or file types, in order to simplify explanation of concepts herein, embodiments may be described with specific reference to particular tools (including but not limited to Kubernetes, Crossplane, Buildkite, Vault, and Argo CD, for example), platforms (including but not limited to Google Cloud Platform (GCP), Azure, and Amazon Web Services (AWS), for example), and file types (including but not limited to Helm charts, Terraform files, and YAML files, for example). It should be noted that such references are for purposes of example and explanation only and should not be construed and/or viewed as limiting application of the embodiments described herein to those particular tools, platforms, or file types. It will be recognized that as used herein, the word file may be used to refer to any type of structure in which data or other information may be stored in any form (e.g., a data structure).

Kubernetes is a portable, extensible, open source platform for managing containerized workloads and services, that facilitates both declarative configuration and automation.

Crossplane connects a Kubernetes cluster to external, non-Kubernetes resources and enables the creation of custom Kubernetes application programming interfaces (APIs) for consuming those resources. Crossplane creates Kubernetes CRDs to represent the external resources as native Kubernetes objects, in connection with which standard Kubernetes commands can be used. Crossplane also acts as a controller to monitor the state of the external resources and provide state enforcement.

YAML, which was originally an acronym for Yet Another Markup Language but has been redefined as an acronym for YAML Ain't Markup Language, is a digestible data serialization language that may be used to create configuration files with any programming language and was designed for human interaction.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110*a*-110*e*), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within $+/-20\%$ of a target value (e.g., within $+/-5$ or $10\%$ of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170, which in some embodiments may comprise an ADSC. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth©, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.)

obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Multi-Region Infrastructure Provisioning Architecture

As noted above, although embodiments described herein may be implemented in connection with and find application to any number of different open source and/or commercial software tools, platforms, and/or file types, in order to simplify explanation of concepts herein, embodiments may be described with specific reference to particular tools (including but not limited to Kubernetes, Crossplane, Buildkite, and Argo CD, for example), platforms (including but not limited to Google Cloud Platform (GCP), Azure, and Amazon Web Services (AWS), for example), and file types (including but not limited to Helm charts, Terraform files, and YAML files, for example). It should be noted that such references are for purposes of example and explanation only and should not be construed and/or viewed as limiting application of the embodiments described herein to those particular tools, platforms, or file types.

Within the scope of a cloud infrastructure deployment, region refers to a self-contained collection of resources distributed across several zones (e.g., physically distinct data centers) that share a common underlying networking and control infrastructure. While distributed and generally resilient to localized failures, an individual region can still experience widespread and catastrophic failures, limiting or completely preventing access to any of the resources deployed and managed thereby.

Environment refers to a collection of self-contained resources deployed in a single- or multi-region architecture, which collectively provides services to a well-defined subset of AVs. An environment can be categorized functionally (e.g., a staging environment or a production environment) or across business logical boundaries (e.g., a North American (NA) production environment).

Regional deployment is synonymous with environment specialized to a single region. Cross-regional replication refers to data replication strategies that enable a single- or multi-clustered database to replicate data across regions under certain guarantees of consistency and availability, usually within certain constraints of network partitioning.

As noted above, an environment, or regional deployment, may be defined as a self-contained set of cloud resources, PaaS cluster, and services (including their configurations) that enable the critical functions of cloud services to support a set of AVs. In a previous model, each service may be described as a set of Helm charts, which describe on-cluster resources and their provisioning via K8s primitives to a predefined PaaS cluster, and a number of Terraform files that describe provisioning and configuration of off-cluster cloud resources (e.g., SQL databases, PubSub topics, Route53 Domain Name System (DNS) records, etc.) via Terraform files. Terraform is an infrastructure as code tool that enables safe and predictable provisioning and management of infrastructure in any cloud platform.

Embodiments described herein provide a well-defined, strongly-typed application programming interface (API) that supports self-service creation of opinionated infrastructure resources through API calls by any user.

Figure 2:
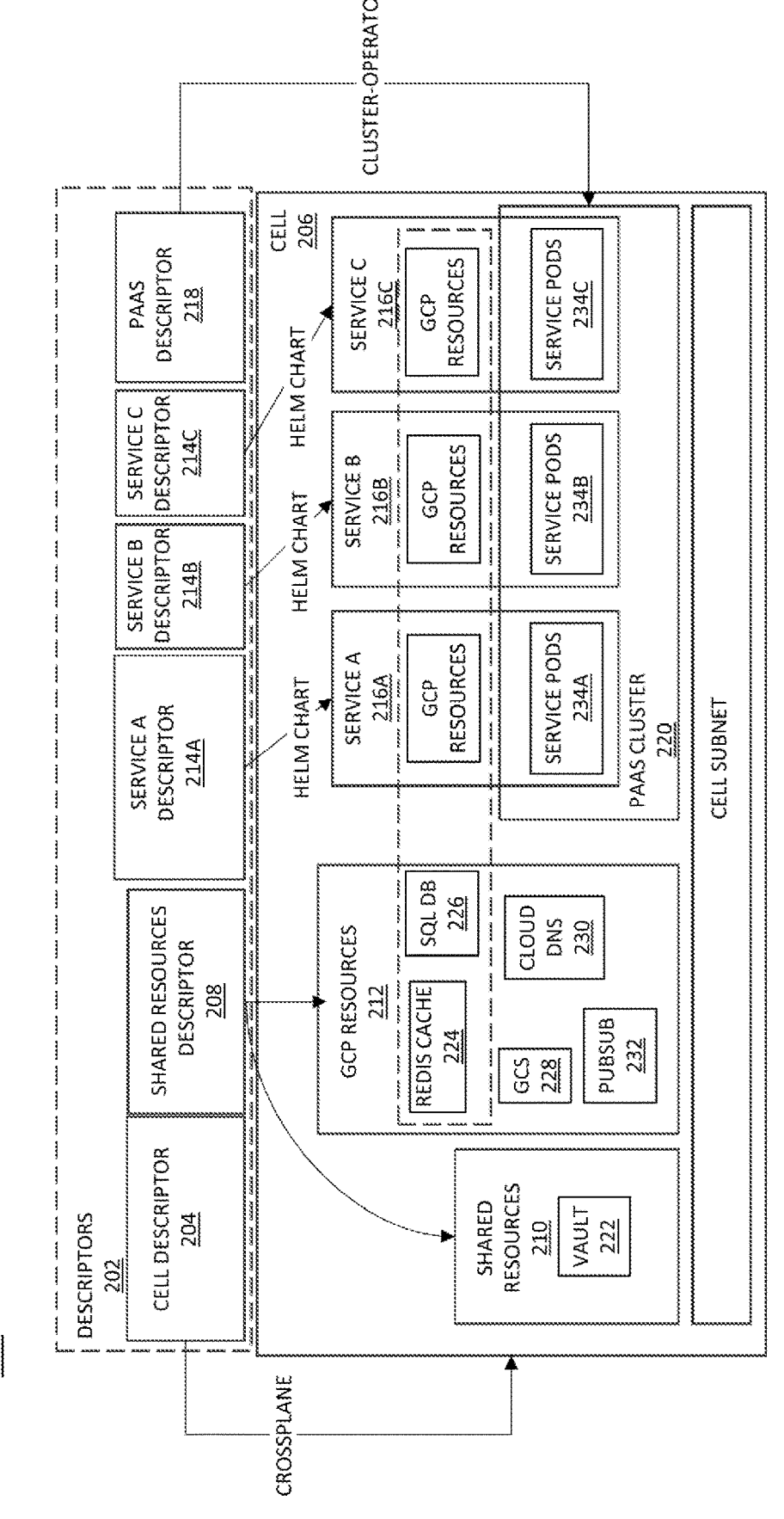
FIG. 2 illustrates a simplified block diagram of an example deployment environment, according to some aspects of the disclosed technology.

FIG. 2 illustrates a simplified block diagram of an example environment 200. As shown in FIG. 2, environment includes a plurality of descriptors 202, including a cell descriptor 204 for describing a cell 206, a shared resources descriptor 208 for describing shared resources 210 and cloud platform resources (e.g., Google Cloud Platform (GCP)

resources, Amazon Web Services (AWS) resources, Azure resources) 212, services descriptors 214A-214C for describing services 216A-216C, respectively, and a PaaS cluster descriptor 218 for describing a PaaS cluster 220. As shown in FIG. 2, shared resources 210 may include secrets manager resources 222 and cloud platform resources 212 may include one or more of Redis cache resources 224, cloud SQL database resources 226, GCS resources 228, cloud DNS resources 230, and PubSub resources 232. PaaS cluster 220 may include service pods 234A-234C associated with services 216A-216C, respectively.

In particular embodiments, cell descriptor 204 may describe networking, global GCP resources, cluster, and DNS permissions of cell 206 using Crossplane primitives. Shared resources descriptor 208 may describe GCP and non-GCP shared resources. Services descriptors 214A-214C may describe K8s deployment (e.g., Helm chart), service-specific GCP resources (e.g., SQL, Redis, PubSub Topics, etc.), Service Dependencies, and URIs, connection strings, env vars, etc., for corresponding services 216A-216C. PaaS cluster descriptor 218 may describe nodes and global K8s entities (e.g., RBAC, ingress, etc.) for PaaS cluster 220.

In previous models, the actual deployment of the elements of environment 200 may be driven by asynchronous flows that are not necessarily coordinated, with limited automation requiring a number of manual steps and checks between them. The fundamental limitation in such a deployment model is that the abstractions offered to development teams are still too closely tied to the underlying infrastructure constructs, while the palette of options is not sufficiently constrained, leading to sprawl, lack of homogeneity of solutions, and a large diversity of implementations.

In accordance with features of embodiments described herein, a simplified model is based on a limited subset of opinionated cloud resources with a constrained set of options and size-based variants, including an object store, a cache, a SQL database, and a messaging PubSub, for example. These abstractions may be closer to how a service development team may think about their infrastructure needs. They provide sufficient optionality to enable meeting differing needs for scale and efficiency but are constrained enough that they can be acted upon with highly automated tools, removing much of the need for human intervention and manual labor.

To address the issue of diverging technologies between on-cluster K8s resources and off-cluster cloud resources, as well as to abstract away from the specifics of a given cloud provider, a Cloud Native Computing Foundation (CNCF)-endorsed open source technology referred to as Crossplane has been adopted to enable both kinds of resources to be fully described in a unified manner via K8s primitives. In particular implementations, Crossplane is a controller that maintains definitions that represent external resources. The controller can further watch the state of external resources and provide state enforcement. If a change (e.g., modification or deletion) is made to the external resources, the controller may reconcile the change by reversing the change or recreating a deleted resource.

In accordance with features of embodiments described herein, creation, deployment, and operation of all components of an environment may be defined by a number of custom resources (CRs) using Crossplane to orchestrate them. The CRs can be defined in a directory as CR definitions (CRDs) and can enable the provision of full automation in deploying all of the supporting infrastructure required to run services (e.g., networking, security, logging and metrics, etc.), integration with PaaS cluster Helm charts, and abstractions for select supported Google Cloud Platform (GCP) resources (e.g., databases, PubSub, Vault, etc.) with the ability to scale up or down both at creation and, when possible, during operation. They can further provide all expected K8s functionality, and can enable an opinionated PaaS environment in which only a limited subset of resources may be available and only a limited set of options may be configurable. The restricted set of choices results in ease-of-use, simplicity of deployment, and full automation and scalability. In other words, if a user can deploy once, they can deploy many times with almost the same amount of effort.

Figure 3:
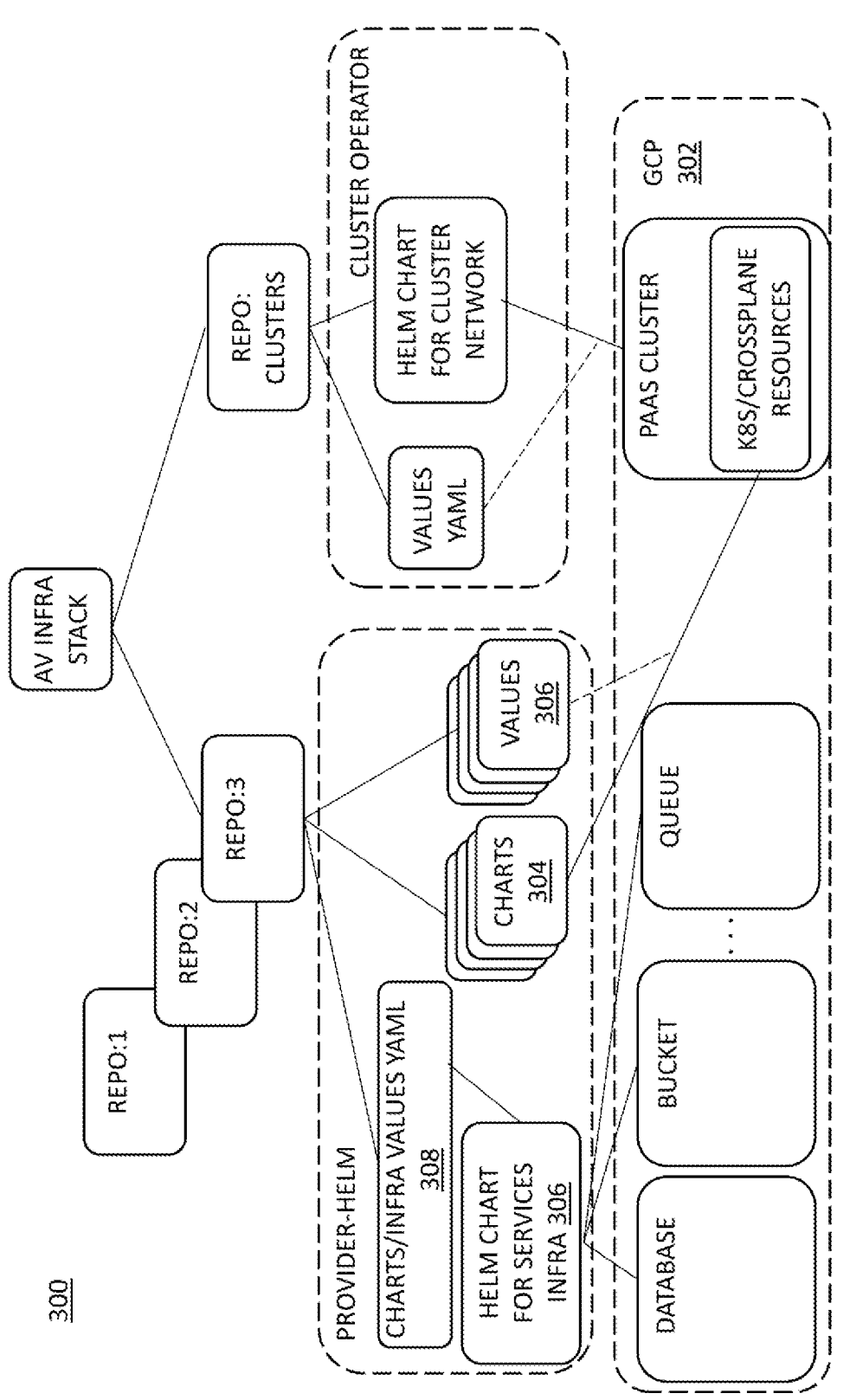
FIG. 3 illustrates a simplified block diagram of another example deployment environment, according to some aspects of the disclosed technology.

FIG. 3 illustrates an example of a simplified deployment model 300 in accordance with features of embodiments described herein. As illustrated in FIG. 3, in accordance with features with embodiments described herein, to deploy a service to a PaaS cluster 301 of a GCP 302, a service-specific Helm chart 304 and a corresponding values YAML file 306 need to be defined. YAML is a human-readable data serialization language that is often used for writing configuration files. A Helm chart may include a collection of YAML template files organized into a specific directory structure.

The service-specific Helm chart may define all resources that the service needs both on- and off-cluster. The values YAML file may specify the configuration values for the K8s and Crossplane resources 308, as defined in the corresponding service-specific Helm chart. These resources can live alongside the service code or in a dedicated repository. A number of global services and patterns may need to be deployed across several regions and may need to be aware of the regional structure. Such services, and associated cloud resources, may be deployed in a manner essentially identical to that described above.

It will be recognized that certain resources may have associated therewith different attributes that will need to be specified as a configuration value in the corresponding YAML file when provisioning the resource. For example, attributes for a cache resource may include a Region (e.g., us-west1, us-west2, us-east1, us-east2), a Size (e.g., S (which may correspond to 1 GB), M (which may correspond to 10 GB), L (which may correspond to 50 GB), XL (which may correspond to 100 GB)). There may also be a default attribute value if a value is not specified (e.g., S for cache Size).

To provision cloud resources using PaaS Crossplane in accordance with features of embodiments described herein, an environment, or project, must be set up. In particular embodiments, a resource lifecycle manager may be used to establish a GCP project for hosting the to-be-provisioned cloud resources. Next, target K8s clusters may be selected. It will be noted that in particular embodiments, certain infrastructure resources are needed once per region and others are needed once for multiple regions (referred to as geo). Resources needed once per region are deployed alongside the already existing K8s application resources. Resources needed once for multiple regions may be deployed on a central provisioning cluster. Resources needed once for multiple regions may include object store (or GCS bucket), Cloud SQL database, PubSub topic, PubSub subscription, Cloud Spanner database (or Cloud Spanner DB), and AM binding (which may be used for binding roles (e.g., PubSub subscriber) associated with a resource (e.g., PubSub topic) to a given service account. Resources needed once per region may include Redis cache, Kubernetes firewall openings, GCP service account, PubSub topic, PubSub subscription, GCS bucket, and AM binding.

In particular embodiments, secrets manager (which may be implemented using HashiCorp Vault) is used to store the information of infrastructure resources (e.g., a GCP service account key for the service account resource). Non-exhaustive example information of each infrastructure resource written into secrets manager is provided below in Table 1.

and values YAML files to the Argo CD instance 402. Additionally, the GHE instance 406 triggers a Buildkite instance 408, which initiates a Buildkite pipeline and registers a container with a Google Container Register instance 409. Buildkite is a platform for running fast, secure, and scalable continuous integration pipelines on infrastructure.

TABLE 1

| INFRASTRUCTURE RESOURCES | CONNECTION DETAILS IN SECRETS MANAGER |
|---|---|
| SpannerDB | SPANNER_PROJECT_ID: the project ID where the database exists<br>SPANNER_INSTANCE_ID: the spanner instance ID where the database is associated<br>SPANNER_DATABASE_ID: the database ID<br>key.json: A key to a generated service account with database user permissions |
| Database | privateIPPrimary: the private IP endpoint of the primary instance<br>serverCACertPrimary: server CA certificate of primary instance<br>clientCertPrimary: client certificate of primary instance<br>connectionNamePrimary: the name of the primary instance<br>privateIPSecondary: the private IP endpoint of the secondary instance<br>serverCACertSecondary: server CA certificate of secondary instance<br>clientCertSecondary: client certificate of secondary instance<br>connectionNameSecondary: the name of the secondary instance<br>user: the user of the database<br>databaseName: the name of the database<br>project: the GCP project where the database exists |
| Bucket | bucketName: the name of the bucket<br>serviceaccountEmail: the email of the generated default service account with object admin permissions<br>key.json: a key to the generated service account |
| ServiceAccount | key.json: a key to the generated service account |
| Topic | topicID: ID of the topic<br>publisherEmail: the email of the generated service account with publisher permissions<br>publisherKey: a key to the generated publisher service account |
| Subscription | subscriptionID: ID of the subscription<br>subscriberEmail: the email of the generated service account with subscriber permissions<br>subscriberKey: a key to the generated subscriber service account |

Figure 4:
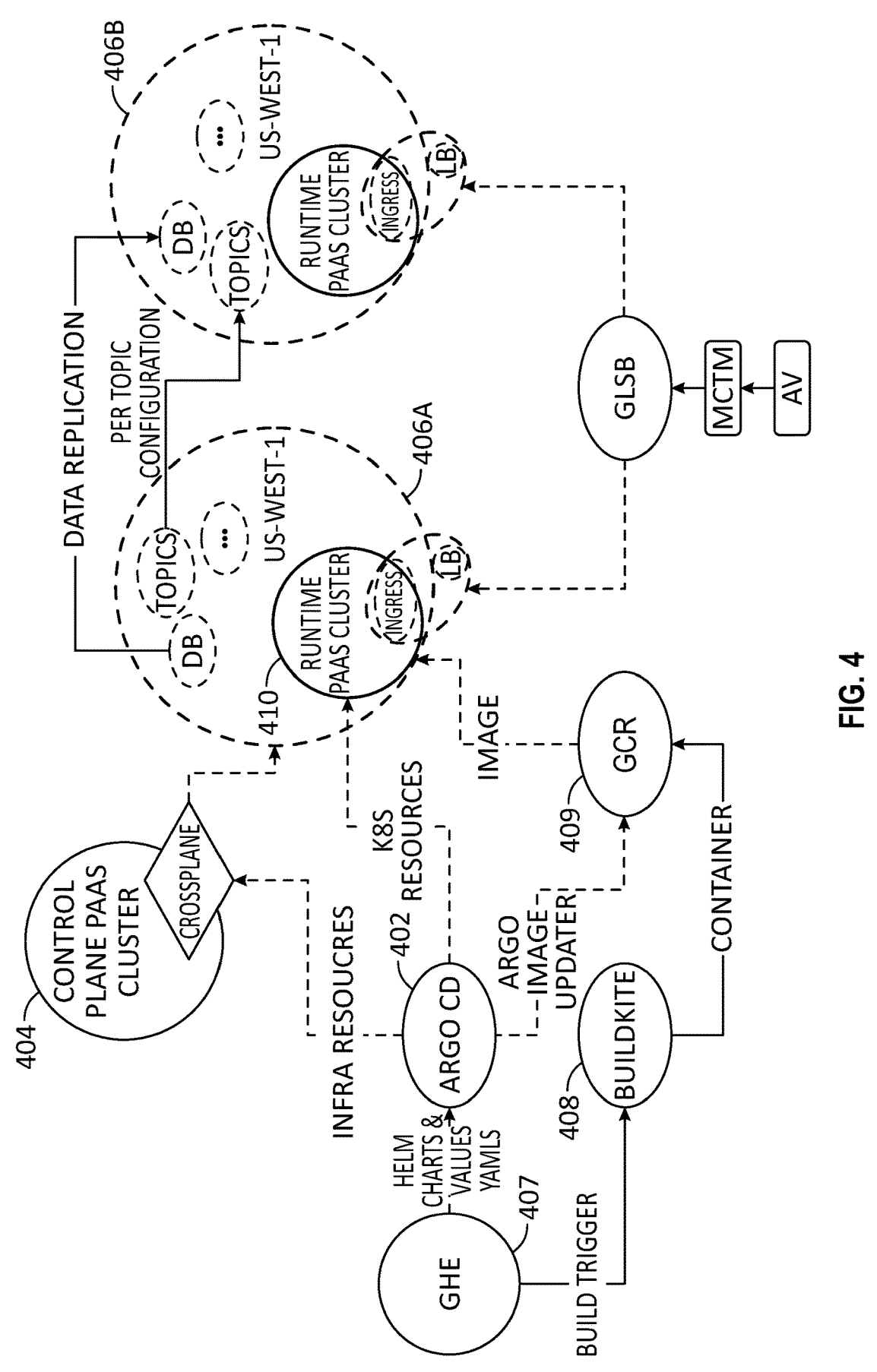
FIG. 4 illustrates a flow diagram of an example deployment, according to some aspects of the disclosed technology.

FIG. 4 illustrates a simplified flow diagram of a multi-region environment 400 in accordance with features of embodiments described herein. In particular, FIG. 4 illustrates use by an Argo CD instance 402 of a Crossplane-enabled PaaS cluster 404 to provide full automated CD with GitHub web hooks to enable deployment (and keeping up-to-date across releases) a completely self-defined set of services 406A, 406B, in the environment 400. The deployment can span several regions simply by updating the list of targets in the appropriate configurations.

Argo CD is implemented as a K8s controller that continuously monitors running applications and compares the current, live state against the desired target state. A deployed application whose live state deviates from the target state is considered OutOfSync. Argo CD reports and visualizes the differences, while providing facilities to automatically or manually sync the live state back to the desired target state. Any modifications made to the desired target state can be automatically applied and reflected in the specified target environments.

Referring to FIG. 4, in operation, a GitHub Enterprise (GHE) instance 407 forwards service-specific Helm charts The Argo CD instance 402 deploys infrastructure resources at the PaaS cluster 404 and K8s resources at a runtime PaaS cluster 410 as defined by the Helm charts and corresponding values YAML files.

Each service-specific Helm chart defines all of the resources needed by a service, including on-cluster resources, such as image name, ConfigMaps, and Secrets, for example, and off-cluster resources, such as database and cache. The corresponding values YAML file specifies the configuration values for all of the Kubernetes (on-cluster) and Crossplane (off-cluster) resources needed, as specified in the corresponding service-specific Helm chart. The resources can live alongside the service node or in a dedicated repository, utilizing a GitOps approach.

Figure 5:
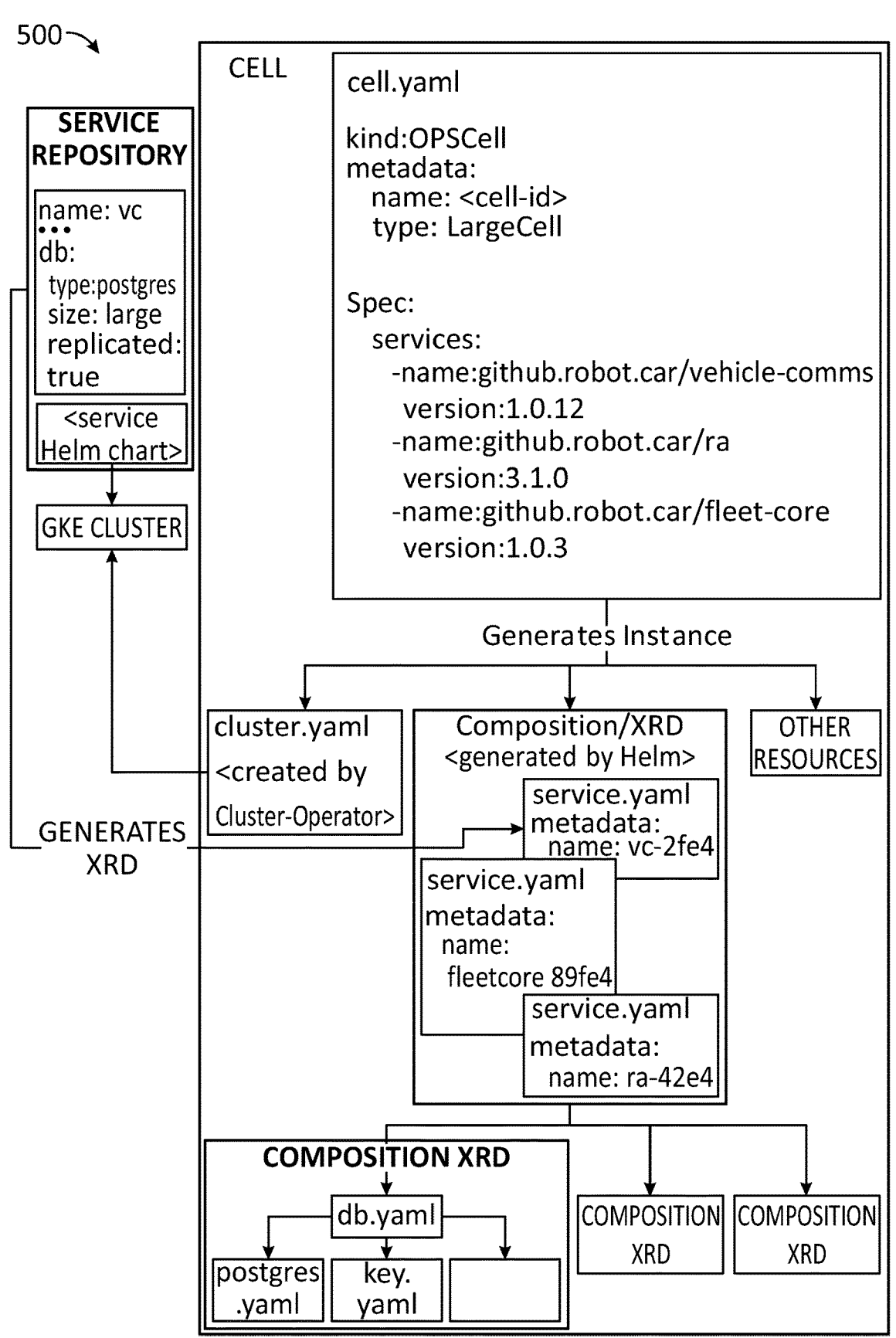
FIG. 5 illustrates another diagram of example deployment, according to some aspects of the disclosed technology.

FIG. 5 is a simplified block diagram of an example deployment 500 in accordance with features of embodiments described herein.

At a high level, provisioning of an infrastructure resource in accordance with embodiments described herein involves the following steps:

1. create an infrastructure resource deployment Helm chart and associated Buildkite pipeline;

2. modify the service deployment YAML file to use the new secrets stored in secrets manager; and 3. retrieve the secrets from secrets manager to connect to the resource.

To subscribe to a PubSub topic created by the infrastructure, one need only create a YAML file CRD, extract the secrets from secrets manager, and use the secrets to connect to GCP PubSub.

Example Processor-Based System

Figure 6:
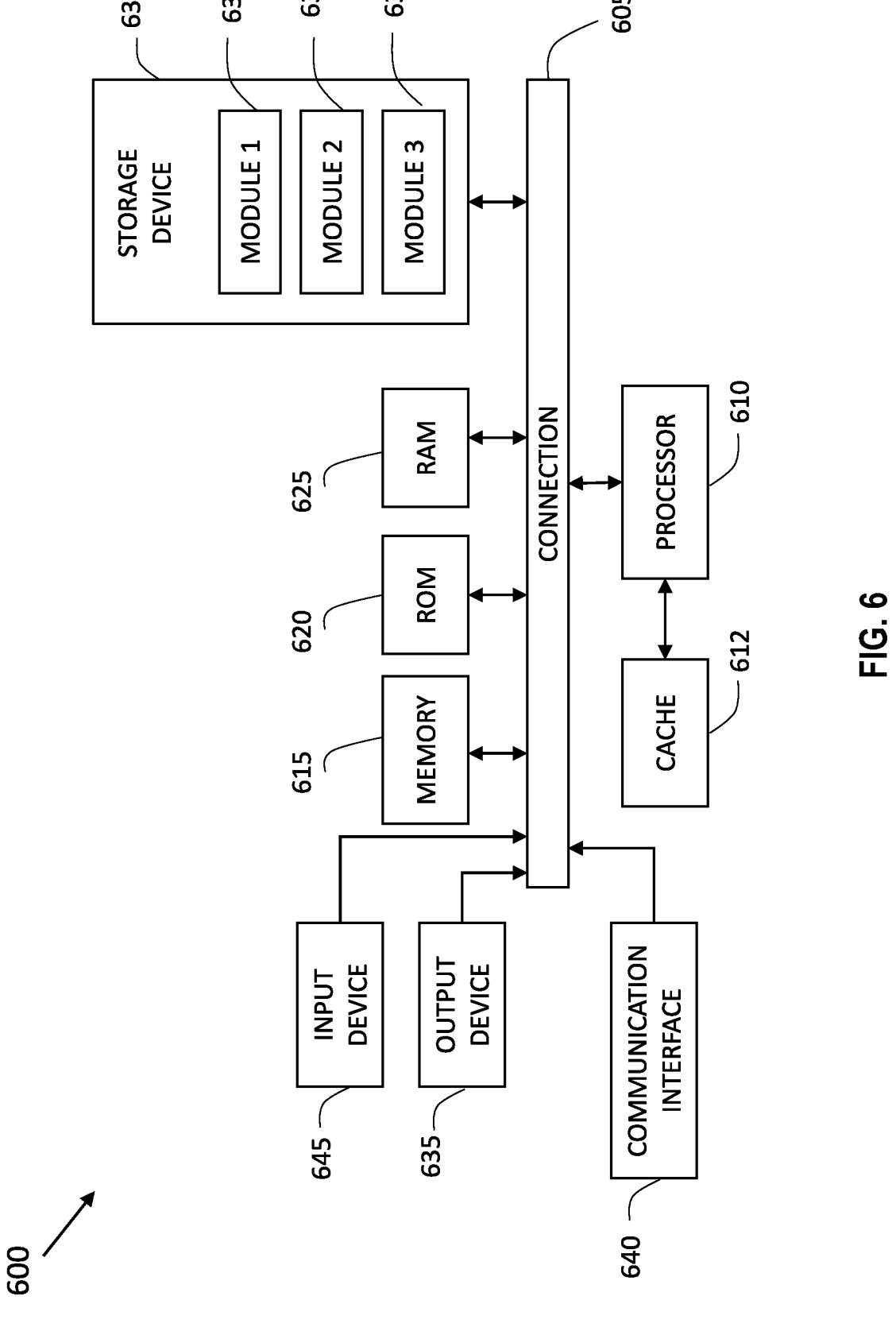
FIG. 6 illustrates an example processor-based system with which some aspects of the disclosed technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more GNSS receivers or transceivers that are used to determine a location of the computing system 600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a system for provisioning a plurality of resources in connection with a service to be provided in an autonomous vehicle (AV) infrastructure environment, the system including a cloud platform executing a platform as a service (PaaS) cluster; a service-specific file specifying the plurality of resources; a values file specifying configuration information for each of the plurality of resource specified in the service-specific file; and a service for deploying the plurality of resources including the service on the cloud services platform using the service-specific file and the values file.

Example 2 provides the system of example 1, further including a secrets manager storing secrets in connection with at least one of the plurality of resources, in which the secrets are stored at a location identified by a path and in which the values file identifies the location.

Example 3 provides the system of example 2, in which the secrets are accessed prior to the deploying of the service on the cloud platform Example 4 provides the system of any one of examples 1-3, in which the service-specific file includes a Helm file.

Example 5 provides the system of any one of examples 1-4, in which the values file include a YAML file.

Example 6 provides the system of any one of examples 1-5, in which the values file includes at least one attribute value for at least one of the plurality of resources.

Example 7 provides the system of any one of examples 1-6, in which at least one of the plurality of resources includes a Kubernetes resource, in which the Kubernetes resource is deployed on the PaaS cluster.

Example 8 provides the system of any one of examples 1-7, in which at least one of the plurality of resources includes an infrastructure resource.

Example 9 provides the system of any one of examples 1-8, in which the plurality of resources includes at least one of a cache, an SQL database, a Spanner database, an object store, a firewall, a service account, an AM binding, a PubSub topic, and a PubSub subscription.

Example 10 provides the system of any one of examples 1-9, in which the cloud platform includes Google Cloud Platform.

Example 11 provides the system of any one of examples 1-10, in which the cloud infrastructure environment includes a multi-regional environment.

Example 12 provides a computer-implemented method for provisioning a plurality of resources in connection with a service to be provided in an autonomous vehicle (AV) infrastructure environment, the system including executing a platform as a service (PaaS) cluster on a cloud services platform; receiving a service-specific file specifying the plurality of resources; receiving a values file specifying configuration information for each of the plurality of resource specified in the service-specific file, in which the values file specifies a location of secrets stored in a secrets manager in connection with at least one of the plurality of resources, in which the location is identified by a path; accessing the secrets using the path identified in the values file; and subsequent to accessing the secrets, deploying the resources on the cloud services platform using the service-specific file and the values file.

Example 13 provides the computer-implemented method of example 12, in which the service-specific file includes a Helm file and the values file includes a YAML file.

Example 14 provides the computer-implemented method of example 12 or 13, in which the values file includes at least one attribute value for at least one of the plurality of resources.

Example 15 provides the computer-implemented method of any one of examples 12-14, in which at least one of the plurality of resources includes a Kubernetes resource, in which the Kubernetes resource is deployed on the PaaS cluster, and at least one other one of the plurality of resources includes an infrastructure resource.

Example 16 provides the computer-implemented method of any one of examples 12-15, in which the plurality of resources includes at least one of a cache, an SQL database, a Spanner database, an object store, a firewall, a service account, an AM binding, a PubSub topic, and a PubSub subscription.

Example 17 provides one or more non-transitory computer-readable storage media including instructions for execution that, when executed by a processor, are operable to cause to be performed operations including executing a platform as a service (PaaS) cluster on a cloud services platform; receiving a service-specific file specifying the plurality of resources; receiving a values file specifying configuration information for each of the plurality of resource specified in the service-specific file, in which the values file specifies a location of secrets stored in a secrets manager in connection with at least one of the plurality of resources, in which the location is identified by a path, and in which the values file includes at least one attribute value for at least one of the plurality of resources; accessing the secrets using the path identified in the values file; and subsequent to accessing the secrets, deploying the resources on the cloud services platform using the service-specific file and the values file.

Example 18 provides the one or more non-transitory computer-readable storage media of example 17, in which the service-specific file includes a Helm file and the values file includes a YAML file.

Example 19 provides the one or more non-transitory computer-readable storage media of example 17 or 18, in which at least one of the plurality of resources includes a Kubernetes resource, in which the Kubernetes resource is deployed on the PaaS cluster, and at least one other one of the plurality of resources includes an infrastructure resource.

Example 20 provides the one or more non-transitory computer-readable storage media of any one of examples 17-19, in which the plurality of resources includes at least one of a cache, an SQL database, a Spanner database, an object store, a firewall, a service account, an AM binding, a PubSub topic, and a PubSub subscription.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A computer-implemented method for provisioning a plurality of resources in connection with a service to be provided in an autonomous vehicle (AV) infrastructure environment, the computer-implemented method comprising:

executing a platform as a service (PaaS) cluster on a cloud services platform;

receiving a service-specific file specifying the plurality of resources;

receiving a values file specifying configuration information for each of the plurality of resources specified in the service-specific file, wherein the values file specifies a location of secrets stored in a secrets manager in connection with at least one of the plurality of resources, wherein the location is identified by a path;

accessing the secrets using the path identified in the values file; and subsequent to accessing the secrets, deploying the plurality of resources on the cloud services platform using the service-specific file and the values file.

2. The computer-implemented method of claim 1, wherein the secrets comprise credentials for accessing the at least one of the plurality of resources.

3. The computer-implemented method of claim 1, wherein the values file includes at least one attribute value for at least one of the plurality of resources.

4. The computer-implemented method of claim 1, wherein at least one of the plurality of resources is deployed on the PaaS cluster.

5. The computer-implemented method of claim 1, wherein at least one of the plurality of resources comprises an infrastructure resource.

6. The computer-implemented method of claim 1, wherein the plurality of resources comprises at least one of a cache, an SQL database, a Spanner database, an object store, a firewall, a service account, an AM binding, a PubSub topic, and a PubSub subscription.

7. A system for provisioning a plurality of resources in connection with a service to be provided in an autonomous vehicle (AV) infrastructure environment, the system comprising:

one or more processors; and memory storing instructions that when executed on the one or more processors cause the one or more processors to perform operations comprising:

executing a platform as a service (PaaS) cluster on a cloud services platform;

receiving a service-specific file specifying the plurality of resources;

receiving a values file specifying configuration information for each of the plurality of resources specified in the service-specific file, wherein the values file specifies a location of secrets stored in a secrets manager in connection with at least one of the plurality of resources, wherein the location is identified by a path;

accessing the secrets using the path identified in the values file; and deploying the plurality of resources on the cloud services platform using the service-specific file and the values file.

8. The system of claim 7, further comprising a secrets manager that stores the secrets in connection with at least one of the plurality of resources.

9. The system of claim 8, wherein the secrets are accessed prior to deploying the plurality of resources on the cloud services platform.

10. The system of claim 7, wherein the service-specific file comprises a Helm file.

11. The system of claim 7, wherein the values file comprises a YAML file.

12. The system of claim 7, wherein the values file includes at least one attribute value for at least one of the plurality of resources.

13. The system of claim 7, wherein at least one of the plurality of resources is deployed on the PaaS cluster.

14. The system of claim 7, wherein at least one of the plurality of resources comprises an infrastructure resource.

15. The system of claim 7, wherein the plurality of resources comprises at least one of a cache, an SQL database, a Spanner database, an object store, a firewall, a service account, an AM binding, a PubSub topic, and a PubSub subscription.

16. The system of claim 7, wherein the AV infrastructure environment comprises a multi-regional environment.

17. One or more non-transitory computer-readable storage media comprising instructions for execution that, when executed by a processor, are operable to cause to be performed operations comprising:

executing a platform as a service (PaaS) cluster on a cloud services platform;

receiving a service-specific file specifying a plurality of resources;

receiving a values file specifying configuration information for each of the plurality of resources specified in the service-specific file, wherein the values file specifies a location of secrets stored in a secrets manager in connection with at least one of the plurality of resources, wherein the location is identified by a path, and wherein the values file includes at least one attribute value for at least one of the plurality of resources;

accessing the secrets using the path identified in the values file; and subsequent to accessing the secrets, deploying the plurality of resources on the cloud services platform using the service-specific file and the values file.

18. The one or more non-transitory computer-readable storage media of claim 17, wherein the service-specific file comprises a Helm file and the values file comprises a YAML file.

19. The one or more non-transitory computer-readable storage media of claim 17, wherein at least one of the plurality of resources comprises a Kubernetes resource, wherein the Kubernetes resource is deployed on the PaaS cluster, and at least one other one of the plurality of resources comprises an infrastructure resource.

20. The one or more non-transitory computer-readable storage media of claim 17, wherein the plurality of resources comprises at least one of a cache, an SQL database, a Spanner database, an object store, a firewall, a service account, an AM binding, a PubSub topic, and a PubSub subscription.

* * * * *